United States Patent [19]
Eckle

[11] 3,774,276
[45] Nov. 27, 1973

[54] CUTTING-OFF TOOL
[75] Inventor: Otto Eckle, Lochgau, Germany
[73] Assignee: KOMET Stahlhalter und Werkzeugfabrik Robert Brouning GmbH, Besigham um Neckar, Germany
[22] Filed: Apr. 29, 1971
[21] Appl. No.: 138,500

[30] Foreign Application Priority Data
Apr. 30, 1970 Germany.................. P 20 21 200.4

[52] U.S. Cl. .................................................. 29/96
[51] Int. Cl. .............................................. B26d 1/00
[58] Field of Search ............................... 29/96, 95 R

[56] References Cited
UNITED STATES PATENTS
3,599,303   8/1971   Sletten ................................... 29/95
3,220,089   11/1965  Hammers ............................... 29/96
3,499,198   3/1970   Pollard et al. ......................... 29/96
1,432,467   10/1922  Karlsen ................................... 29/96
3,504,413   4/1970   Siewert et al. ......................... 29/95

Primary Examiner—Leonidas Vlachos
Attorney—Woodhams, Blanchard & Flynn

[57] ABSTRACT

A cutting tool wherein the clamping arm is arranged so that it is movable with respect to the cutter carrier in the longitudinal direction thereof, and has at its front end a supporting surface securing the cutting body mounted for longitudinal displacement on the cutter carrier against displacement in the longitudinal direction. The clamping arm has approximately the same length as the cutter carrier and is arranged throughout its length, with the exception of its rear end, at a distance from the cutter carrier. The rear end of the clamping arm bears against a supporting body which is adjustable by means of a setscrew extending in the longitudinal direction of the holder and arranged thereon.

12 Claims, 4 Drawing Figures

Patented Nov. 27, 1973 3,774,276
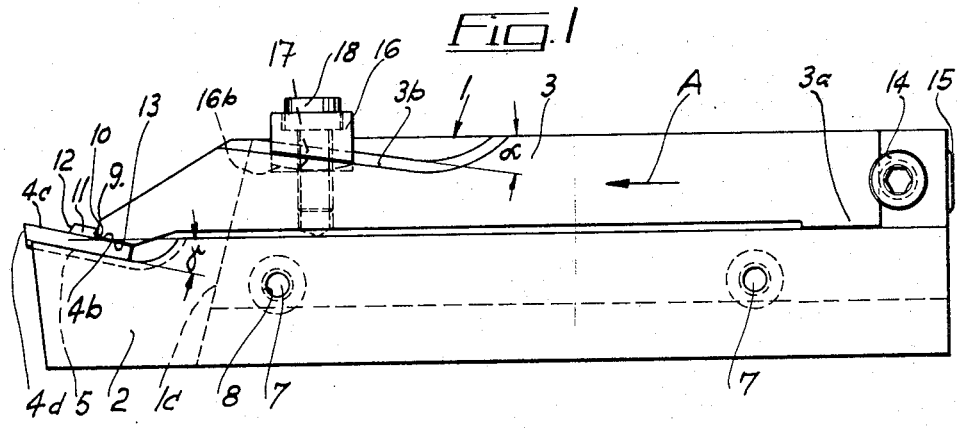
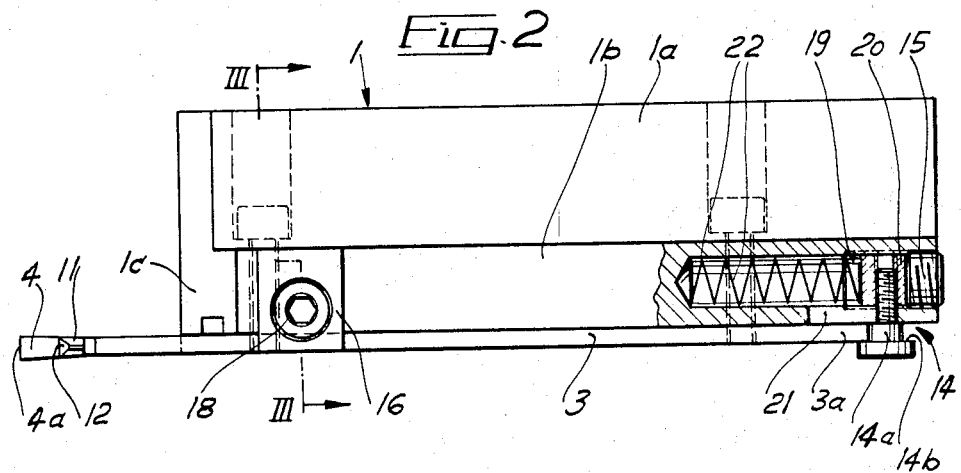
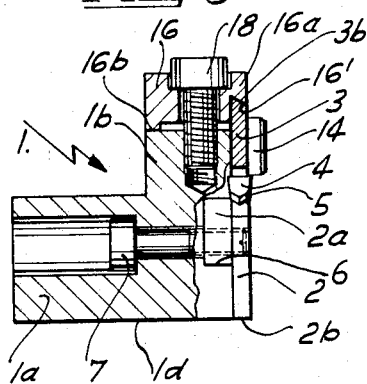
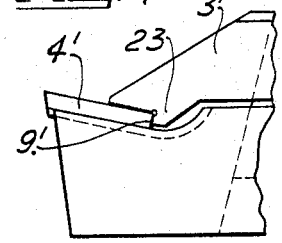
INVENTOR
OTTO ECKLE
BY
Woodhams, Blanchard + Flynn

CUTTING-OFF TOOL

This invention relates to a cutting-off tool consisting of a holder, a blade-like cutter carrier arranged detachably on the lateral face of the holder, an exchangeable cutting body of hard metal or the like mounted at the front end of the cutter carrier in a prismatic groove, and a blade-shaped clamping arm supported at its front end on the top of the cutting body and at its rear end on the cutter carrier under the action of a clamping screw.

In a known cutting-off tool of this kind, a supporting surface extending at right angles to the longitudinal direction of the cutter carrier and on which the cutting body is supported by its back is provided at the end of the prismatic groove. The cutting body is not adjustable in the longitudinal direction of the cutter carrier and consequently cannot be resharpened. When the cutting body has been blunted, it is thrown away and replaced by a new one. This is a disadvantage inasmuch as the cutting body consists of costly hard netal or the like and a substantial part of the cutting body must be used as an engagement surface for the clamping arm.

If the cutting body is used once without resharpening, it is not properly utilized. Moreover, the clamping arm or claw in the known tool is only relatively short and extends approximately over that part which projects forwardly beyond the holder. The clamping arm has approximately in the middle thereof a downwardly projecting leg or limb terminating in a cylindrical disc. This cylindrical disc is swivellably mounted in a corresponding recess in the cutter carrier, as a result of which the forward end of the clamping arm is forced downwardly against the cutting body when the rear end is raised. A clamping screw the axis of which extends transversely of the cutter carrier and which likewise engages in a recess in the cutter carrier is provided for raising the rear end. The clamping screw consists of two parts which form a V-shaped groove between them. The end of the clamping arm or claw is of prismatic form. If the two parts of the clamping screw are screwed together, the rear end of the clamping arm is thereby raised. Because of the arrangement which has been described, the clamping arm of this known cutting-off tool and the cutter carrier are relatively costly to manufacture. Moreover, the holding of the cutting body by means of the short clamping arm is not secure enough. As a result of the cutting pressure and also the heating effect, the cutter carrier may become so deformed that the clamping action between the clamping arm and the cutting body is loosened and the cutting body is consequently wrenched out of the cutter carrier under the cutting pressure.

Also known is a cutting-off tool with an exchangeable cutting body in which the cutter carrier and the holder are in one piece. In this case, the clamping arm is supported on the one hand on the cutting body and on the other hand on the shank of the holder. The cutting body can be adjusted in the longitudinal direction of the holder by means of a setscrew extending approximately in the longitudinal direction of the holder and acting on a thrust piece supported in turn on the back of the cutting body and can consequently be resharpened.

This known tool, however, is costly to manufacture because of its complicated and interengaging structure. Moreoever, a separate holder is required for each width of cutting body. The holder itself has a shank and a head bearing the clamping arm and the cutting body. To achieve the necessary stability, the head of the holder projects downwardly beyond the shank. For this reason, the cutting body is at a relatively large distance with respect to the holder seat or bearing in the turning machine, which results in unstable holding. Moreover, this known cutting-off tool cannot be used in quick-change holders because of the dimensions of its shank, which cannot be made smaller for reasons of stability.

The problem underlying the invention is to provide a cutting-off tool of the type mentioned at the beginning which makes it possible to adjust the cutting body and, consequently resharpen the same, in which secure holding of the cutting body is ensured under all operating conditions and which is moreover simple in structure and thereby cheap to manufacture.

According to the invention, this is achieved in that the clamping arm is arranged so that it is movable with respect to the cutter carrier in the longitudinal direction thereof, that it has at its front end a supporting surface securing the cutting body mounted for longitudinal displacement on the cutter carrier against displacement in the longitudinal direction, that the clamping arm has approximately the same length as the cutter carrier and is arranged throughout its length, with the exception of its rear end, at a distance from the cutter carrier, and that the rear end of the clamping arm bears against a supporting body which is adjustable by means of a setscrew extending in the longitudinal direction of the holder and arranged thereon.

By means of this setscrew and the movable clamping arm, adjustment of the cutting body in the longitudinal direction and, consequently, resharpening or regrinding thereof are possible. Due to the great length of the clamping arm, which is only supported at its front end on the cutting body and is supported at its rear end on the cutter carrier, the clamping arm is bent downwards elastically when the clamping screw is tightened. This results in a resilient clamping of the cutting body, so that it cannot become loose even on heating or bending of the cutter carrier in consequence of the cutting pressure. Holder, cutter carrier and clamping arm are simple in design and consequently also cheap to manufacture. In particular, similarly to what is the case with the cutting-off tool mentioned at the beginning, one and the same holder can be used for cutter carriers of different thicknesses corresponding to cutting bodies of different widths.

Further advantages and details of the invention are described in detail hereinafter with reference to embodiments illustrated in the drawing.

In the drawing:
FIG. 1 is a side view of the new cutting-off tool;
FIG. 2 is a plan view thereof;
FIG. 3 is a cross-section on the line III—III of FIG. 2;
FIG. 4 is a partial side view of another embodiment.

In the drawing, the reference 1 designates the holder, which is advantageously of angular form. The horizontal limb 1a (FIG. 3) of the holder serves to clamp the cutting-off tool in a turning machine, for example in a quick change magazine. The vertical limb 1b serves for reception and abutment of the cutter carrier 2 and the clamping arm or claw 3. The angular design of the holder makes possible, on the one hand, in a favourable manner the arrangement of the new cutting-off tool in a quick-change magazine and, on the other hand, a great moment of resistance is obtained both in the vertical and in the horizontal direction, which imparts a special rigidity to the holder. Moreover, the front end 1c of the holder 1, which faces the workpiece, is inclined upwardly away from the cutting body 4. The bottom bearing surface 1d of the holder consequently extends as closely as possible up to the cutting edge 4a. The cutter carrier 2, which is substantially blade-shaped, has at its front end a prismatic groove 5 for receiving the cutting body 4, which is shaped correspondingly at its underside. The cutter carrier 2 is advantageously provided with a fitting tongue 2a extending in its longitudinal direction on the lateral surface of the carrier facing the holder 1, this tongue being in one piece with the cutter carrier. The holder has a corresponding groove 6 for receiving the tongue. By means of two fixing screws 7 partially countersunk into the holder and which engage in threaded holes 8 which are advantageously provided in the fitting tongue 2a, the cutter carrier 2 is secured additionally to the holder 1. In the event of possible fracture or wear of the cutter carrier, it can consequently easily be exchanged for a new one. In addition, instead of the cutter carrier shown, it would be possible to use a wider or narrower one for a cutting body with a wider or narrower cutting edge. The fitting tongue 2 serves not only to anchor the cutting carrier securely to the holder 1, but also to increase its moment of resistance both in the horizontal and in the vertical direction.

The cutter carrier is advantageously also so designed that its bottom narrow side 2b is flush with the underside 1d of the holder 1.

In this way, the bottom narrow side may also be used for bearing purposes.

The clamping arm 3 is arranged to be movable with respect to the cutter carrier 2 in the longitudinal direction thereof. In the same way, the cutting body 4 is also movable in the prismatic groove 5. In order to secure the cutting body against longitudinal displacement in consequence of the cutting pressure, the clamping arm 3 has a supporting surface 9 which co-operates with the back 10 of a projection 11 which is advantageously provided on the top of the cutting body 4. As can also be seen from the drawing, the clamping arm 3 has approximately the same length as the cutter carrier 2. It is supported on the one hand by means of its forward pressure surface 13 on the top 4b of the cutting body and on the other hand by means of its rear end 3a on the cutter carrier 2. With the exception of its rear end, the clamping arm 3 is arranged at a distance from the top of the cutter carrier 2. The rear end 3a moreover bears against a supporting body 14, which is in the form of a screw in the embodiment shown and is adjustable by means of a setscrew 15 extending in the longitudinal direction of the holder 1, as will be described hereinafter.

In the forward zone of the holder 1 and on the limb 1b thereof there is provided a clamping piece 16 extending transversely of the clamping arm 3. The clamping piece 16 is supported by one of its ends 16a on the top narrow side 3b of the clamping arm and by its other end 16b on the holder 1. The clamping piece 16 moreover has a bore 17 for the passage of a clamping screw 18 extending perpendicularly to the holder. In order to press the clamping arm 3 against the holder 1, one end 16a of the clamping piece is moreoever provided with an inclined thrust surface 16' which is supported on the oblique top narrow side 3b of the clamping arm 3 rising towards the holder. So that the thrust surface 16' may also bear uniformly on the narrow side 3b, it is moreover expedient that the other end 16b of the clamping piece 16 be convex in the longitudinal direction of the holder, as is apparent from the dash line in FIG. 1.

Moreover, the prismatic groove 5 in the cutter carrier and the thrust surface 13 of the clamping arm 3 which bears against the top 4b of the cutting body 4 are advantageously inclined approximately at the positive rake angle γ, which on the average is about 10°. This inclination makes regrinding of the cutting body 4 at its raked/surface 4c unnecessary. The cutting body merely needs to be reground at its free surface 4d.

On adjustment of the clamping arm 3 out of the rearmost position shown in FIG. 1 into its forward position, which becomes necessary with repeated regrinding of the cutting body 4, the clamping arm 3 is raised at its front end in consequence of the inclination of the groove 5. If the clamping screw 18 has been only slightly slackened, wedging will occur between the clamping piece 16 and the clamping arm 3 on the displacement of the latter. In order to prevent this and make possible a sensitive adjustment of the clamping arm 3 in the forward direction, it is moreover advantageous that the top narrow side 3b co-operating with the clamping piece be inclined at about the same angle as, or a somewhat smaller angle α than, the prismatic groove 5. The somewhat smaller angle α results from the fact that it is true that on forward displacement of the clamping arm the front end thereof is raised, but the rear end 3a thereof remains at the same height The angle α is about 8° with an angle γ of 10°. As a result of this special design, the result is obtained that the top narrow side 3b always remains in approximately the same height position in the region of the clamping piece 16.

The setscrew 15 already mentioned hereinbefore can be screwed into a threaded hole 19 provided at the rear end of the holder. Arranged in front of the setscrew is a cylindrical slider 20 into which the supporting screw 14 is screwed at right angles to the axis of the slider. The threaded part of the supporting screw 14 extends through a longitudinal slot 21 in the holder. The rear end 3a of the clamping arm 3 is supported against the shank 14a of the supporting screw. Moreover, a compression spring 22 is arranged between the inner end of the slider 20 and the end of the threaded hole 19. The length of the longitudinal slot 21 in the forward direction is advantageously such that the end thereof serves as an abutment for the supporting screw 14 and consequently the clamping arm 3 can only be adjusted forward to such an extent that secure holding of the cutting body is always ensured.

The supporting screw 14 also advantageously has a flange 14b resting against the lateral surface of the clamping arm 3. By means of this flange 14b, when the supporting screw 14 is tightened, the rear end 3a, on the one hand, is pressed against the holder 1 and the cylindrical slide 20, on the other hand, is pressed against the threaded hold 19. Both parts are consequently clamped fast with respect to the holder 1.

If, on regrinding of the cutting body 4 at its free surface 4d, by which the body become shorter, an adjustment of the cutting body in the forward direction and, consequently a shifting of the clamping arm in the direction A are necessary, the clamping screw 18 and the supporting screw 14 are slackened. By turning the setscrew 15, the slider 20 and, consequently, the supporting screw 14 can be shifted forward sensitively in opposition to the spring 22 until the cutting edge 4a has reached the desired position. The clamping screw 18 and the supporting screw 14 are thereupon retightened. On the tightening of the clamping screw 18, the clamping arm can bend elastically owing to its great length and owing to its distance from the cutter carrier 2. This has the advantage that a uniform pressure is always exerted on the top 4b of the cutting body by the thrust surface 13 of the clamping arm 3 even if, in consequence of the cutting pressure, the front end of the cutter carrier 2 bends downward. Secure clamping of the cutting body is thereby always ensured.

As has already been mentioned, the cutting body 4 advantageously has on its top 4b a projection 11, of which the front 12, which faces the cutting edge, extends obliquely with respect to the raked surface 4c and is formed as a chip deflector. The back 10 of the projection is arranged approximately vertically with respect to the top 4b and co-operates with the supporting surface 9 of the clamping arm. The front end of the clamping arm is protected by the projection 11 serving as a chip deflector.

If necessary, it is also possible to dispense with the projection mentioned and, as shown in FIG. 4, provide a projection 23 with a supporting surface 9' on the clamping arm 3', this supporting surface bearing against the back of the cutting body 4'. In this way, a particularly simple design of the cutting body 4' is obtained and then, of course, the front end of the clamping arm serves as a chip deflector.

The great length of the blade-shaped clamping arm 3 and the advantages associated therewith have already been mentioned several times hereinbefore. This great length is achieved in that, as can be seen from the drawing, the supporting body (in this case a supporting screw) 14 is arranged in the vicinity of the rear end of the holder 1. The length of the clamping arm thereby corresponds approximately to the length of the holder and is even a little greater, as shown in the drawing.

The embodiments of the invention in which an exclusive property or privilege is claimed are defined as follows:

1. In a cutting-off tool having a holder, a cutter carrier arranged detachably on a lateral face of said holder and having a prismatic groove thereon at one end, an exchangeable cutting body of hard metal or the like mounted at said one end of said cutter carrier in said prismatic groove, and a clamping arm supported at one end on the top of said cutting body and at the other end on said cutter carrier under the action of a clamping device, the improvement comprising said clamping arm being adapted to move with respect to said cutter carrier in the longitudinal direction thereof and having at said one end adjacent said cutting body a supporting surface engaging said cutting body, said cutting body being mounted for longitudinal displacement on said cutter carrier and maintained against displacement in the longitudinal direction by said cutter carrier and said supporting surface, said clamping arm having approximately the same length as said cutter carrier and being spaced throughout its length, with the exception of said other end remote from said supporting surface, at a distance from said cutter carrier, and longitudinal adjustable means engaging said other end of said clamping arm for adjusting said clamping arm longitudinally of said holder and cutter carrier, said clamping device including a clamping piece releaseably secured on said holder adjacent said one end and in overlying clamping engagement with said clamping arm above the spaced portions of the clamping arm and cutter carrier, said clamping piece being short relative to said clamping arm and said clamping piece engaging said clamping arm between said supporting surface and said longitudinal adjusting means, said short clamping piece effecting an elastic bending of said clamping arm when tightened but said spacing being maintained, said longitudinal adjustable means including means securing said other end of said clamping arm against movement away from said holder.

2. The improvement according to claim 1, in which said clamping piece is supported by one of its ends on the top of said clamping arm and by its other end on said holder, said clamping piece having a bore for the passage of a clamping screw which extends perpendicularly to the holder.

3. The improvement according to claim 1, wherein said prismatic groove in said cutter carrier and a thrust surface on said clamping arm engaging the top of said cutting body are inclined approximately at the positive rake angle.

4. In a cutting-off tool having a holder, a cutter carrier arranged detachably on a lateral face of said holder and having a prismatic groove thereon at one end, an exchangeable cutting body of hard metal or the like mounted at said one end of said cutter carrier in said prismatic groove, and a clamping arm supported at one end on the top of said cutting body and at the other end on said cutter carrier under the action of a clamping device, the improvement comprising said clamping arm being adapted to move with respect to said cutter carrier in the longitudinal direction thereof and has at said one end adjacent said cutting body a supporting surface engaging said cutting body, said cutting body being mounted for longitudinal displacement on said cutter carrier and maintained against displacement in the longitudinal direction by said cutter carrier and said supporting surface, said clamping arm having approximately the same length as said cutter carrier and is spaced throughout its length, with the exception of said other end remote from said supporting surface, at a distance from said cutter carrier, and a longitudinal adjustable means engaging said other end of said clamping arm for adjusting said clamping arm in said longitudinal direction of said holder, wherein said longitudinal adjustable means comprises a supporting body which is adjustable longitudinally of said holder by means of a longitudinally extending setscrew, wherein said setscrew can be screwed into a threaded hole provided at the rear end of the holder and that in front of the screw there is arranged a cylindrical slider in which a supporting screw is mounted at right angles to the axis of said slider, the threaded part of the supporting screw extending through a longitudinal slot in the holder and the clamping arm being supported on the shank of said screw to thereby define said clamping device, while a compression spring is arranged between the inner end of the slider and the end of the threaded hole.

5. The improvement according to claim 4, wherein said supporting screw has a flange resting against the lateral surface of the clamping arm.

6. The improvement according to claim 1, wherein said cutter carrier has a fitting tongue extending in the longitudinal direction on its lateral surface facing the holder, said tongue being integral with the cutter carrier, and said holder having a corresponding groove for receiving said tongue.

7. The improvement according to claim 6, wherein said fitting tongue is provided with threaded holes for the engagement of fixing screws arranged in the holder.

8. The improvement according to claim 1, wherein the holder is of angular cross-section, the horizontal limb serving to clamp the holder and the vertical limb serving for reception and abutment of the cutter carrier and the clamping arm.

9. The improvement according to claim 1, including a projection on the top of said cutting body of which the front faces the cutting edge, extends obliquely with respect to a raked surface and is formed as a chip deflector, the back of the projection being approximately vertically with respect to the top surface of said cutting body and engaged by the supporting surface of the clamping arm.

10. The improvement according to claim 1, wherein said longitudinal adjustable means comprises a supporting body which is adjustable longitudinally of said holder by means of a longitudinally extending set screw.

11. In a cutting-off tool having a holder, a cutter carrier arranged detachably on a lateral face of said holder and having a prismatic groove thereon at one end, an exchangeable cutting body of hard metal or the like mounted at said one end of said cutter carrier in said prismatic groove, and a clamping arm supported at one end on the top of said cutting body and at the other end on said cutter carrier under the action of a clamping device, the improvement comprising said clamping arm being adapted to move with respect to said cutter carrier in the longitudinal direction thereof and has at said one end adjacent said cutting body a supporting surface engaging said cutting body, said cutting body being mounted for longitudinal displacement on said cutter carrier and maintained against displacement in the longitudinal direction by said cutter carrier and said supporting surface, said clamping arm having approximately the same length as said cutter carrier and is spaced throughout its length, with the exception of said other end remote from said supporting surface, at a distance from said cutter carrier, and longitudinal adjustable means engaging said other end of said clamping arm for adjusting said clamping arm in said longitudinal direction of said holder, a clamping piece on said holder adjacent said one end extending transversely of said clamping arm and which is supported by one of its ends on the top of said clamping arm and by its other end on said holder, said clamping piece having a bore for the passage of a clamping screw which extends perpendicularly to the holder, wherein said one end of said clamping piece has an inclined thrust surface which is supported on an oblique top narrow side of said clamping arm rising towards the holder, wherein said prismatic groove in said cutter carrier and a thrust surface on said clamping arm engaging the top of said cutting body are inclined approximately at the positive rake angle ($\gamma$), and, wherein said top narrow side of said clamping arm cooperating with said clamping piece is inclined at about the same angle as, or a somewhat smaller angle ($\alpha$) than, said prismatic groove, so that on a forward displacement of said clamping arm, said top narrow side always remains in approximately the same height and angular position in the region of the clamping piece.

12. In a cutting-off tool having a holder, a cutter carrier arranged detachably on a lateral face of said holder and having a prismatic groove thereon at one end, an exchangeable cutting body of hard metal or the like mounted at said one end of said cutter carrier in said prismatic groove, and a clamping arm supported at one end on the top of said cutting body and at the other end on said cutter carrier under the action of a clamping device, the improvement comprising said clamping arm being adapted to move with respect to said cutter carrier in the longitudinal direction thereof and has at said one end adjacent said cutting body a supporting surface engaging said cutting body, said cutting body being mounted for longitudinal displacement on said cutter carrier and maintained against displacement in the longitudinal direction by said cutter carrier and said supporting surface, said clamping arm having approximately the same length as said cutter carrier and is spaced throughout its length, with the exception of said other end remote from said supporting surface, at a distance from said cutter carrier, and longitudinal adjustable means engaging said other end of said clamping arm for adjusting said clamping arm in said longitudinal direction of said holder, wherein said cutter carrier has a fitting tongue extending in the longitudinal direction on its lateral surface facing the holder, said tongue being integral with the cutter carrier, and said holder having a corresponding groove for receiving said tongue and wherein said bottom side of the cutter carrier is flush with the underside of the holder.

* * * * *